C. D. EHRET.
DETECTOR.
APPLICATION FILED JULY 29, 1905.
902,569.
Patented Nov. 3, 1908.
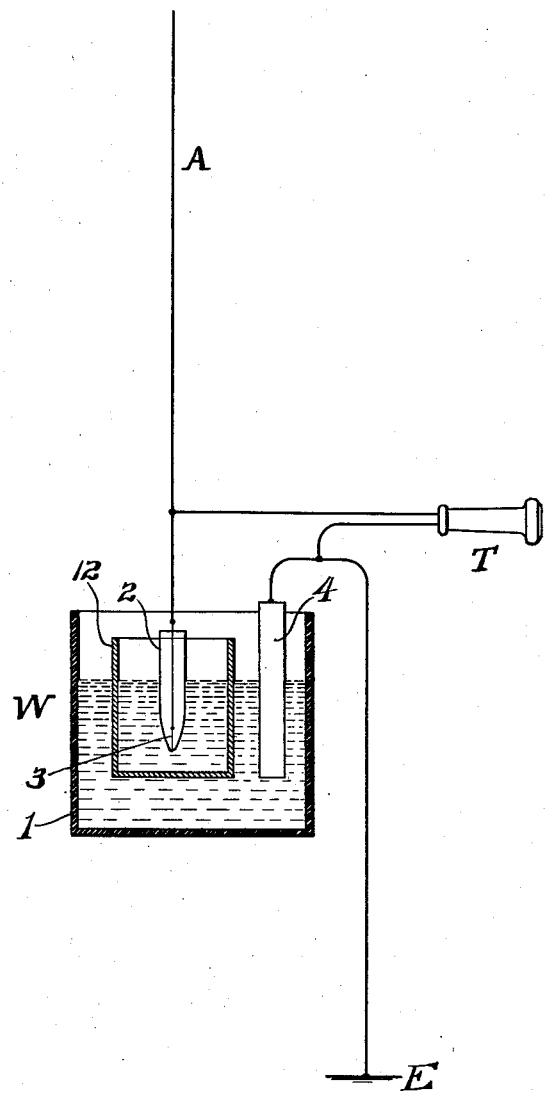
Witnesses
Daniel Webster, Jr.
Anna E. Steinbock
Inventor
Cornelius D. Ehret

UNITED STATES PATENT OFFICE.

CORNELIUS D. EHRET, OF ARDMORE, PENNSYLVANIA, ASSIGNOR TO INTERNATIONAL TELEGRAPH CONSTRUCTION COMPANY, A CORPORATION OF NEW YORK.

DETECTOR.

No. 902,569.  Specification of Letters Patent.  Patented Nov. 3, 1908.

Application filed July 29, 1905. Serial No. 271,854.

*To all whom it may concern:*

Be it known that I, CORNELIUS D. EHRET, a citizen of the United States, residing at Ardmore, county of Montgomery, and State of Pennsylvania, have invented certain new and useful Improvements in Detectors, of which the following is a specification.

My invention resides in apparatus to be employed in wireless signaling systems especially those in which the signal or message during transmission is represented by electro-radiant energy, such as Hertzian waves.

My invention resides in detectors or wave-responsive devices for use in such systems and more especially as to improvements in primary cell detectors.

The invention resides particularly in a two-fluid detector, one of the fluids being, preferably, a chemical depolarizer.

For an illustration of one of the forms my invention may take, reference is to be had to the accompanying drawing, in which the figure represents a two-fluid electro-chemical cell or primary cell detector associated with a receiving conductor.

Between the aerial conductor A and the earth E is connected the wave-responsive device or detector W consisting of a vessel 1, preferably of insulating material containing a cell excitant in liquid or other form. In the cell excitant is disposed the porous earthenware cup 12 containing a material or solution, as for example chromic acid, nitric acid, potassium permanganate, manganese dioxid or the like. In this depolarizing material is immersed the glass tube 2 having sealed therein the small conductor 3 which is preferably ground off flush at the lower end of the glass tube 2. 4 is the other element of the cell and is of a material different from the material of the conductor 3. There is formed in consequence a primary cell detector having a chemical depolarizer for amplifying its action and sensitiveness. The telephone receiver or other signal translating instrument T is connected directly in shunt to the cell. The conductor 3 may be of platinum while the element 4 may be of zinc, iron etc., the cell excitant being dilute sulfuric acid.

In the primary cell detector herein referred to the conductor 3 may be of platinum, carbon, tantalum, copper, steel or iron, or any other suitable material while the element 4 is of different material and preferably located at a distance therefrom in the electro motive force series. In place of dilute sulfuric acid for cell excitant any other known cell excitant may be employed as for example, caustic potash etc. If the element 3 is made of copper, it may be employed in a copper sulfate and zinc sulfate solution to form a Daniel or gravity cell with an element 4 of zinc. The element of small area of contact with the liquid may be copper oxid or oxidized copper wire in a solution of caustic potash, in which case element 4 may be of iron.

What I claim is:—

1. A wave-responsive device consisting of a two fluid primary cell.

2. In a wireless signaling system, receiving apparatus comprising an electro chemical cell as a wave responsive device, depolarizing material in contact with an element of said cell, a second material in said cell, and a second element in contact with said second material.

3. In a wireless signaling system, receiving apparatus comprising a primary cell detector, one element of said cell being in contact with depolarizing material, a cell excitant, and a second element in contact with said cell excitant.

4. In a wireless signaling system, receiving apparatus comprising a primary cell detector, a depolarizer, an element having relatively small area of contact with said depolarizer, a cell excitant, and a second element in contact with said cell excitant.

5. In a wireless signaling system, receiving apparatus comprising a primary cell detector, an element of said cell in contact with depolarizing material, a cell excitant, a second element in contact with said cell excitant, and means for keeping said cell excitant and depolarizing material from mixing.

6. In a wireless signaling system, receiving apparatus comprising a primary cell detector, an element of said cell being in contact with depolarizing fluid, a second element in contact with cell excitant, and porous material for preventing mixture of cell excitant and depolarizer.

7. In a wireless signaling system, a wave-responsive device consisting of a primary cell, an element of said cell having relatively small area of contact with a chemical depolarizer.

8. In a wireless signaling system, receiving apparatus comprising an electro-chemical cell as a wave-responsive device, one element of said cell consisting of a small conductor sealed in insulating material, the insulating material and conductor being ground off flush, whereby the end surface only of the conductor is exposed, a depolarizing material in contact with said exposed conductor, a cell excitant, and a second element in contact with said cell excitant.

9. In a wireless signaling system, receiving apparatus comprising a primary cell detector, one element of said cell consisting of a small conductor sealed in insulating material, said insulating material and conductor being ground off flush, whereby the end surface only of said conductor is exposed, a depolarizing material in contact with said exposed conductor, a cell excitant, and a second element of material other than said small conductor in contact with said cell excitant.

10. In a wireless signaling system, receiving apparatus comprising a primary cell detector, an element of said cell consisting of a small conductor sealed in insulating material, said insulating material and conductor being ground off flush, whereby the end surface only of said conductor is exposed, a depolarizing material in contact with said exposed conductor, a cell excitant, a second element in contact with said cell excitant and of a material located in the galvanic series differently from said small conductor, and an indicating instrument connected to the elements of said cell.

CORNELIUS D. EHRET.

Witnesses:
JAMES H. BELL,
ELEANOR ROBERTS.